Nov. 2, 1965     D. J. PETRANEK     3,214,931

THERMOSTATIC CONTROL FOR REFRIGERATION SYSTEMS

Filed May 25, 1964     2 Sheets-Sheet 1

INVENTOR.
DAVID J. PETRANEK
BY
*Holmes & Andersen*
ATTORNEYS

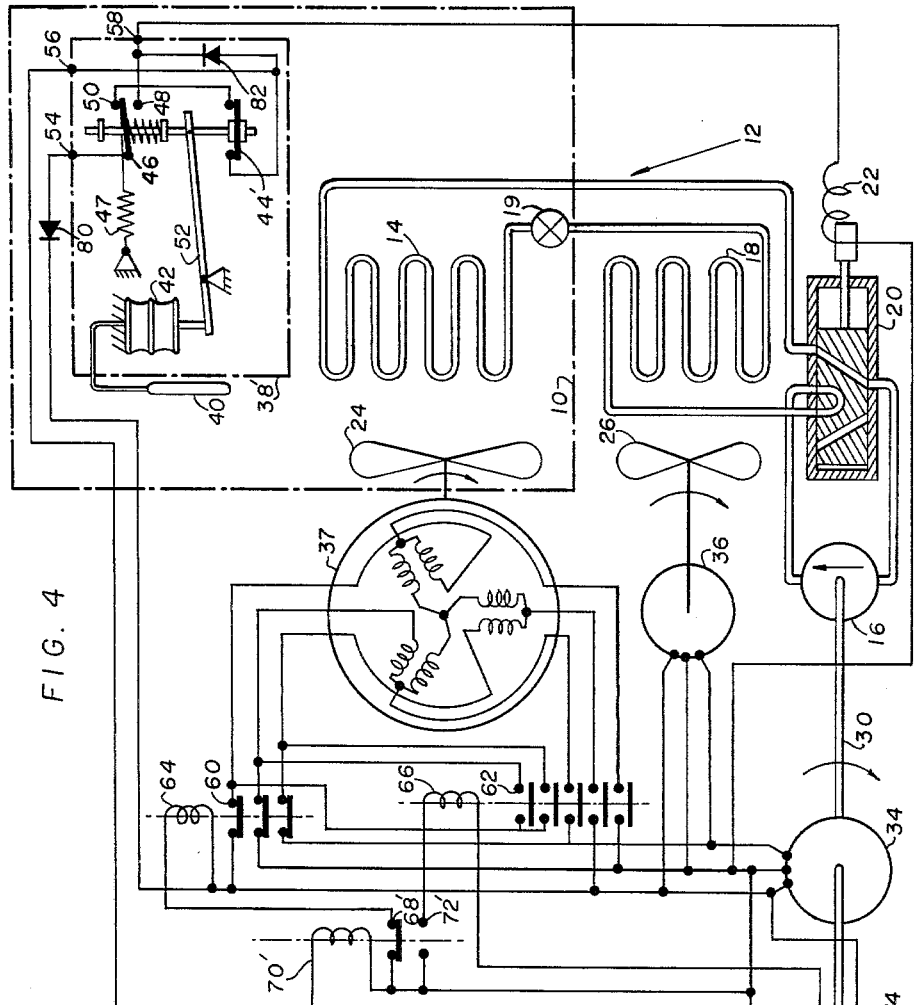

United States Patent Office 3,214,931
Patented Nov. 2, 1965

3,214,931
THERMOSTATIC CONTROL FOR REFRIGERATION SYSTEMS
David J. Petranek, La Crosse, Wis., assignor to The Trane Company, La Crosse, Wis., a corporation of Wisconsin
Filed May 25, 1964, Ser. No. 369,862
7 Claims. (Cl. 62—160)

This invention relates to air conditioning systems and more specifically to control means therefor.

This invention has particular utility in transport air conditioning systems used in the transportation of goods which must be maintained at controlled temperatures such as frozen foods and produce. Such systems employ a refrigeration system having the usual refrigerant compressor, condenser, and evaporator serially connected. Fans are generally employed to circulate air within the conditioned space and through the evaporator heat exchanger which is arranged in fluid communication with the conditioned space.

Where heating is required, hot gas from the compressor may be delivered to the heat exchanger associated with the conditioned space.

Generally, a prime mover such as an internal combustion engine is employed to drive the compressor and fans.

Of course, the thermal load on the air conditioning system will vary from time to time depending upon several factors including variations in ambient temperatures.

It therefore is necessary to control the capacity of such conditioning systems during cooling and heating cycles. One successful method of control has been to vary the speed of the prime mover. While it has not been found practical to continuously match the prime mover speed to the air conditioning load, it is practical to use a continuously running prime mover which is operated at several different speeds to obtain capacity control of the system. In addition to speed control, other forms of capacity control such as cylinder unloading may be used if desired.

Thus, control cycles that provide high speed cooling, low speed cooling, low speed heating and high speed heating have been devised.

Unfortunately such control cycles require rather complex control mechanisms requiring at least three switches to be operated from a single thermal motor such as a bellows type actuator.

The present invention has for its object the provision of a control sequence wherein the system goes into high speed heating directly from low speed cooling.

Another object of this invention is to provide a control sequence wherein the system when operating at low speed cooling may move directly to high speed cooling or high speed heating.

A further object of this invention is to prove a control circuit for a system having the control cycle set forth in the aforementioned objects wherein only two switches actuated by a common thermal motor are required.

Another object is to provide a control circuit for operating a multispeed refrigeration system which is more economical to construct and is completely adequate for most applications.

Still a further object of my invention is to provide a control circuit for a multispeed refrigeration system which employs a simple readily available two stage thermostat.

Other objects and advantages will become apparent as this specification proceeds to describe the invention with reference to the accompanying drawings in which like reference numerals designate like parts wherein:

FIGURE 4 is a schematic diagram of a modified form of the inventive refrigeration control system shown in a high speed cooling cycle;

FIGURE 5 shows the low speed cooling position of the thermostatic control of FIGURE 4; and FIGURE 6 shows the high speed heating position of the thermostatic control of FIGURE 4.

Figure 1:
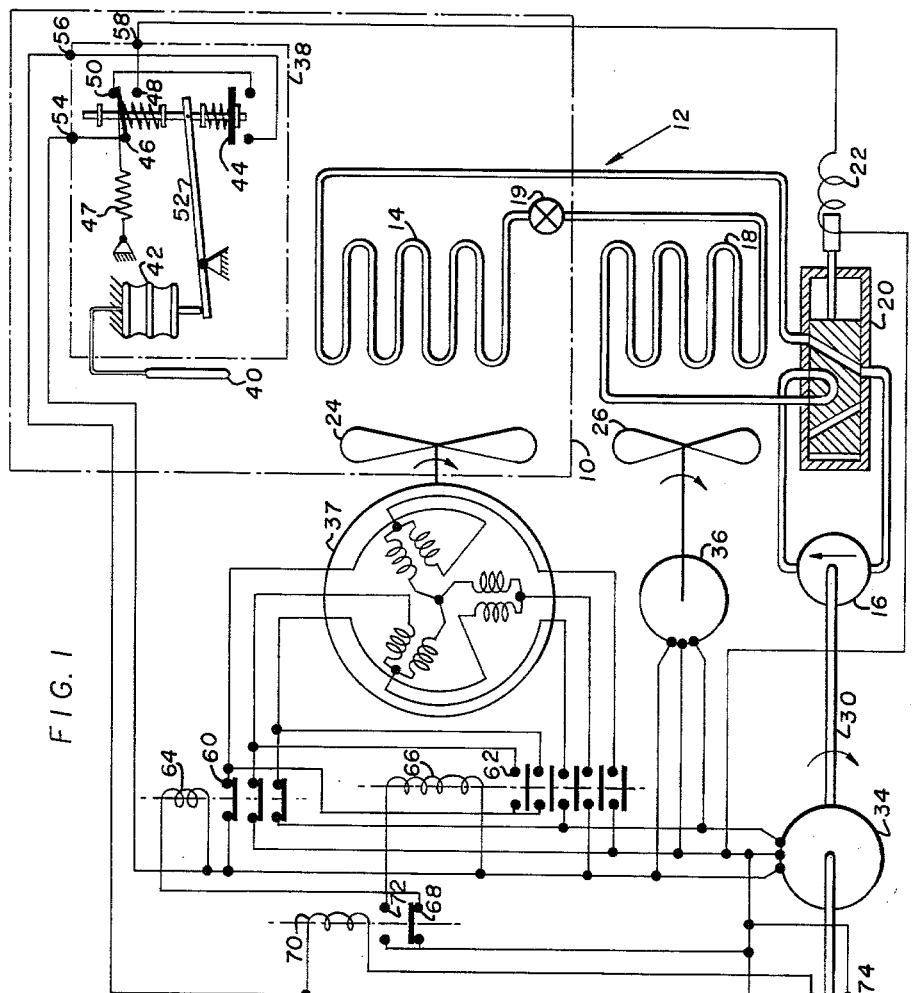
FIGURE 1 is a schematic diagram of the inventive refrigration system shown in a high speed cooling cycle.

Now referring to FIGURE 1 it will be seen that an air conditioned space 10, which may be the cargo space of a refrigerator car or refrigerator truck, is provided with a refrigeration system generally designated by numeral 12. The refrigeration system may be of the conventional reversible heat pump type which includes a first heat exchanger 14 arranged in fluid communication with the conditioned space 10 and preferably is located therein and normally functions as a refrigerant evaporator during the cooling cycle, a refrigerant compressor 16, a second heat exchanger 18 which may be located outside the conditioned space which normally functions as a refrigerant condenser during the cooling cycle, and a refrigerant throttling means 19 connected respectively in series forming a closed refrigerant circuit. Throttling means 19 may take the form of a capillary tube or a variable orifice expansion valve. The particular refrigeration system shown includes a refrigerant flow reversing valve 20 for reversing the direction of refrigerant flow in the first and second heat exchangers whereby the first heat exchanger 14 may be operated as a refrigerant condenser and the second heat exchanger 18 as a refrigerant evaporator. This system when operating in this reverse manner will hereinafter be referred to as the reverse flow heating cycle or more generically as the heating cycle. Valve 20 is actuated to the reverse flow heating cycle position by energization of cycle selector solenoid 22.

A fan means 24 is arranged to circulate air in the conditioned space and through heat exchanger 14. A second fan means 26 may also be arranged to circulate air through heat exchanger 18 for the purpose of heat transfer.

Compressor 16 is driven by an internal combustion engine 28 via torque transmitting means 30. Engine 28 is arranged to operate at two distinct and separate speed ranges, a speed selector solenoid 32 being provided to shift the engine to low speed range when energized. The specifics of the speed control means are well known to those having ordinary skill in the art of engine speed control and do not per se constitute part of the present invention.

Engine 28 in addition to driving compressor 16 also drives a three phase alternating current generator 34. It is particularly desirable that the change in the generator output voltage due to change in speed be substantially proportional to the change in frequency resulting from changes of speed of the engine 28 within the normal speeds of operation. It is well within the scope of those having ordinary skill in the art of generator design to provide such generator characteristics. A model YE-5294 Delco 230 volt three phase 60 cycle A.C. 1200 r.p.m. generator constructed by General Motors Corporation is suitable for this purpose. This generator may be operated at about 600 r.p.m. to produce 115 volt 30 cycle A.C. electric current. Generator 34 is arranged to drive electric motor 36 drivingly connected to fan means 26 and to drive a two speed variable torque reconnected single winding induction motor 37 drivingly connected to fan means 24.

The air conditioning system herein disclosed is provided with a control system which is responsive to temperatures of the conditioned space as by thermostat 38 which is schematically shown. Thermostat 38 functions, as will be seen, to operate the engine speed selector solenoid 32 and the cycle selector solenoid 22 in response to temperatures at the conditioned space. Thermostat 38 includes a temperature sensing bulb 40 disposed in heat exchange relation with the conditioned space and in fluid communication with bellows actuator or thermal motor 42. Thermostate 38 also includes a first switch 44 and a second switch 46, the latter of which may be of the single-pole double-throw snap acting type having contacts 48 and 50. Bellows actuator 42 is operatively connected to switches 44 and 46 via appropriate connecting means 52. While thermostat 38 is shown schematically, it will be understood that switch 46 has but two positions and that transfer from one position to the other is accomplished substantially instantaneously in a snap action, such as for example via an over center spring 47. Type F43A remote bulb thermostat manufactured and sold by United Electric Controls is suitable for this purpose. Thermostat 38 receives electrical power at terminal 54 from generator 34 and delivers it to the speed selector solenoid 32 via terminal 56 and to the cycle selector solenoid 22 via terminal 58.

Generator 34 is electrically connected to supply electric current to motors 36 and 37. Motor 37 is arranged to be connected for either two pole or four pole operation. A first set of contacts 60 is arranged when closed to connect motor 37 to generator 34 for four pole operation. A second set of contacts 62 is arranged when closed to connect motor 37 to generator 34 for two pole operation. Said first and second sets of contacts are closed by energization of coils 64 and 66 respectively.

Coils 64 and 66 are controlled in accordance with the speed of the prime mover, i.e. motor 37 is connected for four pole operation when the prime mover and generator are operated at high speed and for two pole operation when the prime mover and generator are operated at low speed.

While motor 37 has been described as a two and four pole three phase motor, it will be understood that the number of poles used for each prime mover speed range may be selected so that the fan means 24 may be driven at substantially uniform speed. Of course, the number of phases used is purely a matter of choice.

Coil 64 is connected to generator 34 for energization through normally closed contact 68 of relay 70. Coil 66 is connected to generator 34 for energization through normally open contact 72 of relay 70. Relay 70 is connected in parallel with speed selector solenoid 32 and in series with governor switch 74 operatively connected to torque transmitting means 30. Governor switch 74 is normally open at high speed operation and closed at low speed operation. The operation of these members will be more fully explained hereinafter with the operation of the entire control system.

Prior to explaining the operation of the control system, it should be mentioned that cycle selector solenoid 22, speed selector solenoid 32, coils 64, 66, and relay 70 all draw their operating power from generator 34 and preferably from one phase thereof. It should be understood, however, that power from this control circuit may be derived from sources other than the generator such as a battery which may be used for starting engine 28. In any event if a source of power is used having a variable frequency and/or voltage such as the generator, elements 22, 32, 64, 66 and 70 may be designed to operate properly in spite of such variations.

*Operation*

The control system thus described functions to operate the air conditioning system in one of three cycles (high speed heating, low speed cooling and high speed cooling), the cycle of operation being selected by thermostat 38.

FIGURE 1 shows thermostat 38 in the high speed cooling position, i.e. the conditioned space is excessively warm and sensing bulb 40 has expanded bellows 42 to its fully extended condition. Engine 28 is operating at high speed and generator 34 may be for example producing 230 volt, 60 cycle, three phase electric current. Electrical power from one phase is delivered to terminal 54 of thermostat 38. While switch 46 which is connected to terminal 54 is in the position bridging contact 50, the circuit including speed selector solenoid 32, relay 70, and contact 50 remains de-energized as switch 44 in series therewith remains open. Speed selector solenoid 32 which is not energized allows the engine 28 to operate at high speed. Since contact 48 of switch 46 is open, no power is delivered by way of terminal 58 to cycle selector solenoid 22 and the system remains in the cooling cycle. Normally closed contact 68 of relay 70 remains closed thus energizing coil 64 closing set of contacts 60 which connect fan motor 37 for four pole operation. Fan motor 37 may operate for example at 1800 r.p.m. on 230 volt, 60 cycle per second electric power delivered from generator 34. Fan motor 36 and compressor 16 operate at high speed and the refrigeration system thus functions at maximum cooling capacity.

Figure 2:
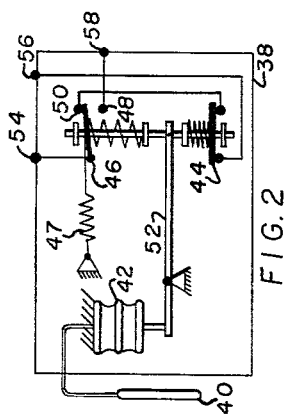
FIGURE 2 shows the low speed cooling position of the thermostatic control of FIGURE 1.

As the temperature in the conditioned space falls, sensing bulb 40 and bellows actuator 42 move the thermostat switch 46 to the low speed cooling position as schematically illustrated in FIGURE 2.

In the low speed cooling position speed selector solenoid 32 and relay 70, which are connected in parallel with each other and in series with terminal 56 of thermostat 38, are energized via a circuit including closed switch 44, switch 46 bridging contact 50, and thermostat terminal 54 connected to one phase of generator 34. Cycle selector 22 remains de-energized and in the cooling position.

Since speed selector solenoid 32 thus is energized, the speed of engine 28 is reduced to the low speed range. Compressor 16 is reduced to low speed for low capacity and the electrical output of generator 34 is reduced for example to 115 volts and 30 cycles per second. Fan motor 36 runs at a proportionately lower or reduced speed.

Although speed selector 32 has been energized, it will be noted that relay 70 in parallel therewith becomes energized only after the speed of the engine 28 has been reduced to a predetermined value at which time governor switch 74 which is in series with relay 70 closes. The energization of relay 70 opens contact 68 and closes contact 72 thus switching motor 37 from four pole to two pole operation, but only after the generator has been reduced to a safe speed for connecting motor 37 for two pole operation. In this condition, fan motor 37 may operate for example at 1800 r.p.m. on 115 volts 30 cycles per second electric power from generator 34. Fan means 24 is thus driven at the same speed as when the other portions of the system were operating at high speed.

It should be noted that switch 74 prevents motor 37 from being energized in the two pole operating condition until the generator has reached a sufficiently low speed so as not to momentarily operate motor 37 at excessively high speeds during the transition period.

Should the system thus operating at low capacity cooling be inadequate to maintain the conditioned space at a sufficiently low temperature, thermostat 38 will move back to its high speed operating position shown in FIGURE 1, actuating engine 28 to high speed, immediately reconnecting motor 37 from two pole operation to four pole operation.

Figure 3:
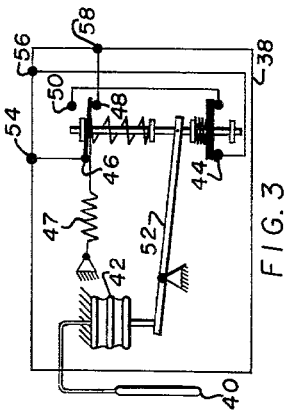
FIGURE 3 shows the high speed heating position of the thermostatic control of FIGURE 1.

However, should the system be operating at low speed cooling and the temperature in the conditioned space become excessively cool, thermostat 38 will move into the position shown in FIGURE 3 for high speed heating, opening the circuit including contact 50, switch 44, terminal 56, speed selector solenoid 32, and relay 70 and closing the circuit including contact 48, terminal 58, and cycle selector solenoid 22. It is important to note that switch 46 breaks with terminal 50 initiating a change of speed immediately prior to the making of switch 46 with terminal 48 to initiate the heating cycle. De-energization of solenoid 32 and relay 70 respectively actuate the engine 28 to high speed and immediately reconnect motor 37 for four pole operation. Energization of cycle selector solenoid 22 places the system on the reverse flow heating cycle by actuating reversing valve 20.

The system now operates at high speed heating. Should the temperature of the conditioned space become excessively high, the thermostat 38 will move into the low speed cooling position shown in FIGURE 2 as previously described. Again it will be noted that during this transition, fan motor 37 is delayed by governor switch 74 from being connected for two pole operation until the engine and generator speeds have been sufficiently reduced so that fan motor 37 is not momentarily operated at excessively high speeds.

Thus, it is seen that while engine 28, generator 34, fan motor 36 and compressor 16 are operated at two distinct speed ranges to obtain capacity control to accommodate the air conditioning load, fan means 24 which is driven by engine 28 is operated at substantially uniform speed to effect uniform circulation in the conditioned space.

It will be apparent from the above description that sets of contactors 60 and 62 could be actuated directly from the coil of relay 70. In such event contactors 60 would be normally closed and sets of contactors 62 normally open.

*Modified form*

A modified form of control system is shown schematically in FIGURES 4–6. To the extent that the elements of this system are the same as that of the system shown in FIGURES 1–3, like reference numerals have been used to identify like parts. To the extent that such parts are only similar, like reference numerals with a prime have been employed.

The system of FIGURE 4 utilizes a thermostat 38' which energizes the speed selector solenoid 32' for high speed operation. Since the action of speed selector solenoid 32' is the reverse of that of solenoid 32 of FIGURE 1, it is necessary also to reverse the action of relay 70. Thus it will be noted that modified relay 70' has a normally open contactor 68' associated with relay coil 64 and normally closed contactor 72' associated with relay coil 66.

Thermostat 38' includes a modified switch 44' which is closed only when the thermostat is calling for high speed cooling. Thermostat 38' is arranged to operate on a source of unidirectional electric power such as for example a battery which may be used in starting the prime mover. For purposes of convenience of illustration, thermostat 38' has been connected to alternating current generator 34 but has been provided with a rectifier 80 in the supply conduit to terminal 54.

Thermostat 38' further includes a unidirectional conducting means 82 such as for example a diode for providing electrical connection between contact 48 and a point in the circuit extending between switch 44' and cycle selector solenoid 22.

In this form of the invention, governor switch 74 is placed in series with coil 66.

*Operation of modified form*

The modified control system as shown in FIGURE 4 is in the high speed cooling position. It will be seen that in the position of the thermostat as shown, a circuit is completed which may be traced from the source of unidirectional current 80 to terminal 54 to contact 50 of switch 46 to switch 44' to speed selector solenoid 32' which is thus energized. Relay 70' which is in parallel with speed selector 32' is of course also energized thereby energizing relay coil 64 via contacts 68' for four pole operation of fan motor 37. No electric current will flow between switch 44' and cycle selector solenoid 22 via unidirectional conducting means 82 as the polarity of the source as applied to means 82 is improper for conductance.

As the temperature in the conditioned space falls, the thermostat 38' moves to the position shown in FIGURE 5 for low speed cooling. The above mentioned circuit, energizing speed selector solenoid 32', is opened by switch 44' causing speed selector solenoid 32' to assume its low speed position. The circuit including cycle selector solenoid 22 remains de-energized, i.e. in the cooling position. In changing from high speed operation to low speed operation relay 70' is de-energized along with speed selector solenoid 32' and contactor 72' of relay 70' in series with coil 66 is closed. However, the energization of coil 66 for connecting fan motor 37 for two pole operation is delayed until governor switch 74 closes indicating that the generator has been reduced to a speed safe for connecting motor 37 for two pole operation.

Should the temperature in the conditioned space become excessively low, thermostat 38' will move to the position shown in FIGURE 6 for high speed heating. In this position switch 46 bridges contact 48 and a circuit is closed which may be traced between the source of unidirectional current 80 to contact 48 of switch 46 to terminal 58 to cycle selector solenoid 22 thus causing valve 20 to assume the heating cycle position. A second circuit is also closed which may be traced between the source of unidirectional electric unit 80 to contact 48 of switch 46 to unidirectional conductor 82 to terminal 56 to speed selector solenoid 32', thus causing engine 28 to operate at high speed. It is important to note that both these circuits are energized simultaneously. The operation of relay 70' will be the same as described above in conjunction with the high speed heating cycle.

Thus it will be apparent that my novel control system provides three cycle operation wherein the system when operating at low speed cooling may change directly to either high speed cooling or high speed heating. The circuit which is made part of my invention requires a minimum of thermally operated switches thus requiring a minimum of cost, adjustment, and maintenance. A simple and readily available two stage thermostat may be employed at the heart of the control system.

Having thus described in detail two of the preferred embodiments of my invention, I contemplate that many changes may be made without departing from the scope or spirit of the invention and I desire to be limited only by the claims.

I claim:

1. In an air conditioning system for conditioning a space and having a closed refrigerant circuit including a refrigerant compressor, a refrigerant condenser, means for throttling refrigerant, and a refrigerant evaporator connected respectively in series, a prime mover operable in two distinct and separate speed ranges drivingly connected to said compressor, a two position speed control means for selecting the speed range for said prime mover, means for operating the refrigerant circuit as a heating cycle and as a cooling cycle, and a two position cycle selector means for selecting the cycle of operation of said refrigerant circuit, the improvement comprising a thermostatically controlled switch means for initiating movement of said cycle selector means toward its heating cycle position, said thermostatically controlled switch means also initiating a change of position of said speed control means to its high speed range position substantially simultaneously with the initiation of the movement of said cycle selector means toward its heating cycle position.

2. The device as defined by claim 1 wherein said thermostatically controlled switch means initiates a change of position of said speed control means immediately prior to the initiation of movement of said cycle selector means toward its heating cycle position.

3. In an air conditioning system for conditioning a space and having a closed refrigerant circuit including a refrigerant compressor, a refrigerant condenser, means for throttling refrigerant, and a refrigerant evaporator connected respectively in series, a prime mover operable in two distinct and separate speed ranges drivingly connected to said compressor, a two position electromagnetic speed control means for selecting the speed range for said prime mover, means for operating the refrigerant circuit as a heating cycle and as a cooling cycle, and a two position electromagnetic cycle selector means for selecting the cycle of operation of said refrigerant circuit, the improvement comprising thermostatic control means responsive to the temperature at said conditioned space for controlling the positions of said two position electromagnetic speed control means and said two position electromagnetic cycle selector means, said thermostatic control means including a first switch, a second switch, circuit means electrically connecting said first switch in series with said two position electromagnetic speed control means and for electrically connecting said second switch in series with said first switch and said two position electromagnetic cycle selector means.

4. The apparatus as defined by claim 3 wherein said second switch is connected to a source of electric power and includes a first contact, a second contact and means for alternately connecting said source of electric power to each of said contacts, said circuit means connecting said first contact in series with said two position electromagnetic cycle selector means and connecting said second contact in series with said first switch.

5. The apparatus as defined by claim 4 wherein said first switch assumes an open position whenever said second switch is in the circuit making position with said first contact and wherein said source of electric power is unidirectional and a unidirectional conducting means electrically connects said first contact to a point in said circuit means electrically between said first switch and said two position electromagnetic cycle selector means.

6. An air conditioning system for conditioning a space and having a closed refrigerant circuit including a refrigerant compressor, a refrigerant condenser, a refrigerant thottling means, and a refrigerant evaporator connected respectively in series, a prime mover operable in a first speed range and a second speed range higher than said first speed range and drivingly connected to said compressor, means for operating the refrigerant circuit as a heating cycle and as a cooling cycle with respect to said conditioned space, first selector means for selecting the cycle of operation of said refrigerant circuit, second selector means for selecting one of said two speed ranges of operation of said prime mover, and means limiting the operation of said second selector means when said refrigerant circuit is operated on said heating cycle.

7. The apparatus as defined by claim 6 wherein said selector is limited to the second speed range position whenever said refrigerant circuit is operated as a heating cycle.

References Cited by the Examiner
UNITED STATES PATENTS 2,887,853   5/59   Talmey _____ 62—323
3,063,251   11/62   Boehmer _____ 62—160

WILLIAM J. WYE, *Primary Examiner.*